June 3, 1952     A. T. BERGQVIST ET AL     2,599,222
LOCKING DEVICE FOR THE TUBES OF TELESCOPIC STRUCTURES
Filed May 9, 1947
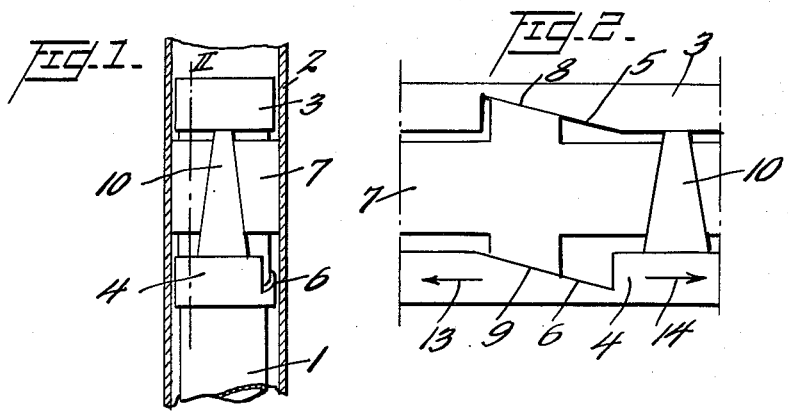
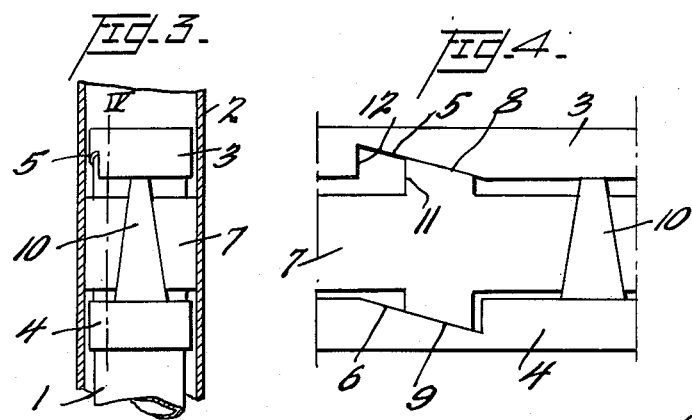
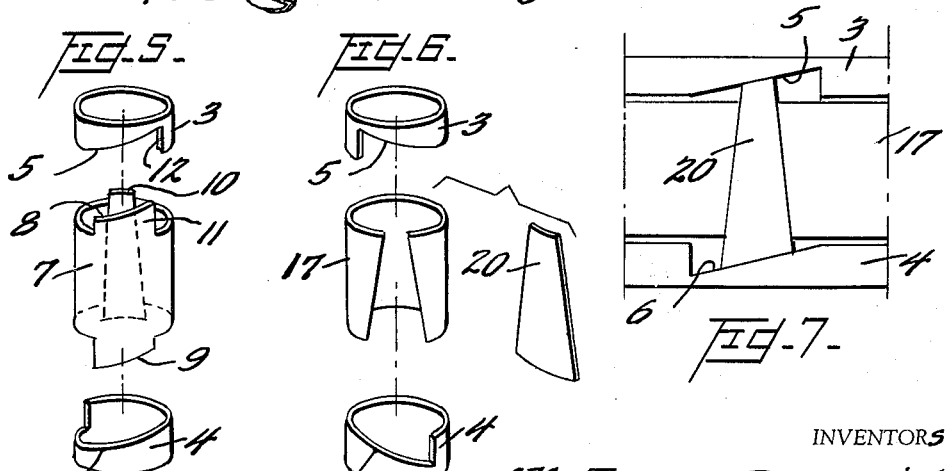
INVENTORS
Åke Torgny Bergqvist
Bror Ivar Ferdinand Karlberg,
BY Sommers & Young
ATTORNEYS Patented June 3, 1952

2,599,222

UNITED STATES PATENT OFFICE 2,599,222

LOCKING DEVICE FOR THE TUBES OF TELESCOPIC STRUCTURES

Åke Torgny Bergqvist and Bror Ivar Ferdinand Karlberg, Finspong, Sweden

Application May 9, 1947, Serial No. 747,160
In Sweden June 5, 1946

3 Claims. (Cl. 287—58)

The present invention relates to means for reliably locking the individual tubes of a telescopic structure against displacement with relation to each other in any desired relative position thereof. More particularly, the invention has for its object to provide means whereby two tubes of such a structure which have indirect engagement with each other, may be locked to each other in any axial position desired by turning them with relation to each other.

A telescopic structure provided with means according to the invention may be of advantage, for instance, when used as legs for cameras, tripods for various kinds of instruments, as tentpoles, radio antennas, fishing rods, music stands, wardrobe rods, electric lamp arms and for other purposes.

The invention is characterized, chiefly, by the fact that a sleeve having a wedge-shaped slit and a wedge inserted in said slit, both of which members are placed between the tubes, are axially adjustable with relation to each other by means of guide elements having oblique guide surfaces which are secured to the inner tube or formed integrally therewith on opposite sides of said sleeve, said guide elements being so designed that upon a rotation of the tubes with relation to each other, they will displace the wedge and the sleeve which is held by soft friction to the outer tube with relation to each other in an axial direction, so as to cause the wedge either to expand the sleeve against the outer tube or, by rotation in the opposite direction, to slide to a certain extent out of the slit, in order to lock the tubes to each other in the axial position desired or release them for permitting axial displacement thereof.

Since the locking device is positioned between the tubes an uninterrupted tubular channel will be obtained between the tubes, which is of a special advantage, for instance, in respect of electric lamps, because it is possible to pull the electric conductors through said channel. Another essential advantage is that in case of an axial load acting on the tubes in one direction (tensile or pressure) the locking effect of the device increases with increased load owing to the fact that the sleeve expands according as the load increases, and is thereby more and more forced against the outer tube.

The invention is illustrated in the accompanying drawing in which,

Fig. 1 is a side elevation, partly in vertical section, of the locking device in normal position, Fig. 2 is a view of the cylindrical surface of the locking device in developed state assumed to have been cut on the line II—II of Fig. 1 and representing the inner surface.

Fig. 3 is a side elevation, partially in vertical section, of the locking device in locked condition.

Fig. 4 is a representation of Fig. 3 in developed state assumed to have been cut on the line IV—IV of Fig. 3, and representing the inner surface.

Fig. 5 is an exploded perspective view of the guide rings and sleeve.

Fig. 6 is a perspective view of the elements of a modified embodiment shown separately.

Fig. 7 is an elevation of the embodiment of Fig. 6 with the parts assembled and in developed state assumed to have been cut on line VII of Fig. 6 and viewing the inner surface.

With reference to the drawing, the numeral 1 designates the inner tube and the numeral 2 the outer tube of a telescopic structure. Provided on the inner tube are two guide elements 3, 4 which are positioned at a distance apart. Said guide elements may, if desired, be integral with the material of the tube or may comprise separate pieces attached by soldering or welding to the tube. The guide elements are formed with oppositely positioned recesses bounded by oblique surfaces 5 and 6.

Surrounding the inner tube is, furthermore, a sleeve 7, which is held by friction formed with a wedge-shaped slit, said sleeve being rotatably and slidably inserted between the elements 3 and 4. The sleeve is provided with projections at its opposite ends, said projections being bounded in axial direction by oblique guide surfaces 8 and 9 which are parallel to each other and to the guide surfaces 5 and 6 of rings 3 and 4 and adapted to slide along the same. By these means the sleeve will be displaced axially between the elements 3 and 4 when rotated with relation to the inner tube.

Engaging the slit of sleeve 7 is a wedge 10 formed as a separate piece the axial position of which is determined by the two elements 3 and 4.

The operation of the mechanism described is as follows:

Sleeve 7 is so designed as to bear against the outer tube even in its released, that is to say, unlocked position, though not more than to permit the tubes to be displaced axially with relation to each other without any essential resistance. If, however, the tubes are so rotated with relation to each other that the inner tube is displaced to the left, as indicated by the arrow 13 in Fig. 2, the sleeve will not take part of this displacement owing to its frictional engagement with the outer tube, with the result that the guide surfaces 8 and 9 of the sleeve will slide along the guide surfaces 5 and 6, respectively. Because of the oblique position of said guide surfaces the sleeve will be displaced axially with relation to the inner tube, as will appear from the final position shown in Fig. 4. In said displacement the oblique surfaces of the slit of sleeve 7 will slide towards the bottom end of the wedge, thereby causing the wedge to expand the sleeve so as to force it with an increased pressure against the inner wall of the outer tube. Now, the tubes are locked against axial movement with relation to each other, and should the tubes be loaded so as to have a tendency for collapsing, the sleeve 7, locked to the tube 2 by soft friction when the tubes are in free telescoping relation, will be forced with an increased pressure against the outer tube, as is readily seen from Fig. 1. It is thus evident, that an increased load results in an improved locking action. If the tubes be subjected to forces tending to pull them from each other, that is, during normal use of the tubes, then the wedge and the sleeve should be turned endwise, that is, through 180° with respect to the collars 3 and 4. In the device in the locked condition as shown in Figs. 3 and 4, an increased locking action is obtained as the result of an increased force tending to move the tubes together, which is due to the fact that the sleeve will be widened by the action of the wedge so as to press against the outer tube. On subjecting the tubes to a pulling action in order to elongate the telescopic structure, a reverse result will be obtained, since in this case the wedge tends to leave the slit. In order to obtain an increased locking action also in this case it is necessary to turn the sleeve endwise and to turn the wedge upside down, so that the base portion of the wedge or the slit will be directed upwards in Figs. 3 and 4.

As will appear from the last paragraph of the specification it is the relative movement between wedge and sleeve which effects the locking action. In Figs. 1 to 5 inclusive of the drawing the axial position of the wedge is fixed, while the sleeve is axially adjustable. In Figs. 6 and 7 of the drawing the wedge 20 may be axially adjusted while the axial position of the sleeve 17 is a fixed one. In locked position the load is transmitted from tube 2 to sleeve 7 and from there to wedge 10, to be finally transmitted to the element 4 and the tube 1.

If it is desired to release the interlocked tubes from each other, then the tubes should be rotated in the opposite directions, that is to say, so that the inner tube is moved to the right, as indicated by the arrow 14 in Fig. 2, with relation to the outer tube, with the resulting effect that sleeve 7 which accompanies the outer tube, will be displaced upwardly by the action of the guide surfaces 5 and 6 so as to move towards the top of the wedge 10 with relation to the inner tube. By this operation the sleeve will reduce its diameter to a certain extent by narrowing its slit, thereby again allowing an axial displacement. On continued rotation of the inner tube to the right the sleeve is caused to accompany the inner tube owing to the fact that the edge surface 12, which is a part of ring 3 on the inner tube and hence also moving toward the right, engages the edge surface 11 of the sleeve. In this rotation no locking effect is obtained.

In the drawing we have shown as an example of the relative movement of sleeve 7 and wedge 10 a constructional form in which the axial position of the wedge is fixed between the guide elements 3 and 4, whereas the sleeve may be displaced. It is to be noted, however, that the inverse arrangement may be used without departing from the principle of the invention, as shown in Figs. 6 and 7, that is to say, the axial position of the sleeve may be fixed by the guide elements, whereas the wedge, comprised as a separate element, is formed with oblique guide surfaces to be engaged by the oblique guide surfaces of the guide rings, so that the wedge may be displaced axially.

What we claim is:

1. A telescopic arrangement of tubes having a device for locking two coengaging tubes against axial movements with relation to each other, comprising in combination, an outer tube, an inner tube of such a diameter as to leave a radial space between itself and the outer tube, two axially spaced annular elements rigidly secured to the inner tube, the edges of said elements facing each other having oppositely positioned cam surfaces along a portion of their periphery and lying for their remainder portion in planes at right angles to the axis of the tube, a sleeve member in the radial space between the tube and in the axial space between the said annular elements of the inner tube, said sleeve member having an axially extending wedge-shape slit so as to be flexible, the inner and outer diameters of said sleeve member being such as to allow rotation of the sleeve member on the inner tube while preventing rotation thereof with relation to the outer tube due to frictional contact between the sleeve member and the outer tube, a wedge member in engagement with the edges of the slit of the sleeve member so as to form an expansion member for the sleeve member, one of said members being in engagement with the cam surfaces of the annular elements of the inner tube, and the other member being in engagement with other portions of the edges of said annular elements for effecting a relative axial displacement of the sleeve member and the wedge member with relation to each other as the result of a rotation of the tubes with relation to each other for effecting a clamping of the sleeve member and thus also of the inner tube to the outer tube on a relative rotation of the tubes in one direction.

2. An arrangement as claimed in claim 1, and in which the sleeve member is movable axially between the annular elements supported by the inner tube and is formed with axially projecting parts having sloping surfaces for cooperation with cam surfaces of said elements.

3. Arrangement as claimed in claim 1 and in which the wedge member is formed with oblique end surfaces for cooperation with the cam surfaces of the annular elements supported by the inner tube, whereas the sleeve member is locked against axial displacement by direct contact with said elements.

ÅKE TORGNY BERGQVIST.
BROR IVAR FERDINAND KARLBERG.

REFERENCES CITED

The following references are of record in the file of this patent:

UNITED STATES PATENTS

| Number | Name | Date |
|---|---|---|
| 570,179 | Miller | Oct. 27, 1896 |
| 621,294 | Culver | Mar. 14, 1899 |

FOREIGN PATENTS

| Number | Country | Date |
|---|---|---|
| 600,216 | Great Britain | Apr. 2, 1948 |